United States Patent
Campion et al.

(10) Patent No.: US 9,160,152 B2
(45) Date of Patent: Oct. 13, 2015

(54) TRANSMISSION CABLE INSTALLATION DEVICE

(75) Inventors: Jean-Luc Campion, Saint Quay Perros (FR); Jean-Pierre Louboutin, Trebeurden (FR); Jean-Michel Landouar, Tredrez Loquemeau (FR)

(73) Assignee: FRANCE TELECOM, Paris (FR)

( * ) Notice: Subject to any disclaimer, the term of this patent is extended or adjusted under 35 U.S.C. 154(b) by 140 days.

(21) Appl. No.: 13/499,222

(22) PCT Filed: Sep. 30, 2010

(86) PCT No.: PCT/FR2010/052059
§ 371 (c)(1),
(2), (4) Date: Mar. 29, 2012

(87) PCT Pub. No.: WO2011/039479
PCT Pub. Date: Apr. 7, 2011

(65) Prior Publication Data
US 2012/0187354 A1    Jul. 26, 2012

(30) Foreign Application Priority Data
Sep. 30, 2009   (FR) .................................... 09 56778

(51) Int. Cl.
*H02G 1/08* (2006.01)
*H02G 3/04* (2006.01)
*G02B 6/44* (2006.01)

(52) U.S. Cl.
CPC ............ *H02G 3/0481* (2013.01); *G02B 6/4429* (2013.01); *G02B 6/4471* (2013.01); *G02B 6/4495* (2013.01); *H02G 1/08* (2013.01)

(58) Field of Classification Search
USPC .................................................... 254/134.3 R
See application file for complete search history.

(56) References Cited

U.S. PATENT DOCUMENTS

| | | | | |
|---|---|---|---|---|
| 4,236,453 A | * | 12/1980 | Collen | 104/15 |
| 4,313,382 A | * | 2/1982 | Bommart | 104/307 |
| 4,414,454 A | * | 11/1983 | Zollinger | 219/53 |
| 4,929,816 A | * | 5/1990 | Theurer et al. | 219/53 |
| 5,006,198 A | * | 4/1991 | Pasquini | 156/559 |
| 5,136,140 A | * | 8/1992 | Theurer et al. | 219/161 |

(Continued)

FOREIGN PATENT DOCUMENTS

| | | | | |
|---|---|---|---|---|
| DE | 3031833 A1 | | 5/1982 | |
| DE | 3315473 A1 | * | 10/1984 | ............... G02B 5/16 |

(Continued)

OTHER PUBLICATIONS

International Search Report and Written Opinion dated Jan. 2, 2012 for corresponding International Application No. PCT/FR2010/052059, filed Sep. 20, 2010.

(Continued)

*Primary Examiner* — Lee D Wilson
*Assistant Examiner* — Alvin Grant
(74) *Attorney, Agent, or Firm* — David D. Brush; Westman, Champlin & Koehler, P.A.

(57) ABSTRACT

A transmission cable installation device is provided, which includes a protective sheath surrounding at least one transmission cable and having at least one longitudinal recess. A rigid element is inserted in one of said at least one recess. Also provided are a protective sheath and a profiled support suitable for being inserted in a recess in the protective sheath.

9 Claims, 4 Drawing Sheets

(56) References Cited

U.S. PATENT DOCUMENTS

| | | | |
|---|---|---|---|
| 5,175,405 A * | 12/1992 | Karimine et al. | 219/54 |
| 5,203,814 A * | 4/1993 | Kushizaki et al. | 29/897.2 |
| 5,270,514 A * | 12/1993 | Wechselberger et al. | 219/100 |
| 5,575,416 A * | 11/1996 | Oellerer et al. | 228/49.1 |
| 5,941,514 A * | 8/1999 | Burcaw | 269/37 |
| 6,069,333 A * | 5/2000 | Morlock | 219/54 |
| 6,166,347 A * | 12/2000 | Morlock | 219/54 |
| 6,207,920 B1 * | 3/2001 | Morlock | 219/54 |
| 6,246,820 B1 * | 6/2001 | Le Cam et al. | 385/100 |
| 6,297,472 B1 * | 10/2001 | Bong et al. | 219/125.12 |
| 6,355,906 B1 * | 3/2002 | Okuno et al. | 219/121.63 |
| 6,396,020 B1 * | 5/2002 | Thelen et al. | 219/54 |
| 6,407,364 B1 * | 6/2002 | Mumaw | 219/125.12 |
| 6,424,772 B1 | 7/2002 | Blazer et al. | |
| 6,540,208 B1 * | 4/2003 | Pecot et al. | 254/134.4 |
| 6,764,434 B1 * | 7/2004 | Volk | 483/36 |
| 6,787,726 B2 * | 9/2004 | Thelen et al. | 219/54 |
| 7,027,697 B2 * | 4/2006 | Tatarka et al. | 385/110 |
| 7,520,415 B2 * | 4/2009 | Kral et al. | 228/119 |
| 7,523,707 B2 * | 4/2009 | Theurer et al. | 104/15 |
| 7,753,351 B2 * | 7/2010 | Yajima et al. | 269/152 |
| 7,866,642 B2 * | 1/2011 | McAllister | 269/37 |
| 2004/0112629 A1 * | 6/2004 | Rossi | 174/115 |

FOREIGN PATENT DOCUMENTS

| | | |
|---|---|---|
| DE | 102007038327 A1 | 12/2008 |
| EP | 1220398 A2 | 7/2002 |
| WO | WO 2005009036 A1 * | 1/2005 |

OTHER PUBLICATIONS

English translation of the Written Opinion dated Jan. 2, 2012 for corresponding International Application No. PCT/FR2010/052059, filed Sep. 20, 2010.

French Search Report and written opinion dated May 11, 2010 for corresponding French Application No. 0956778, filed Sep. 30, 2009.

* cited by examiner

TRANSMISSION CABLE INSTALLATION DEVICE

CROSS-REFERENCE TO RELATED APPLICATIONS

This Application is a Section 371 National Stage Application of International Application No. PCT/FR2010/052059, filed Sep. 30, 2010, which is incorporated by reference in its entirety and published as WO 2011/039479 on Apr. 7, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the field of laying cables in buildings.

BACKGROUND OF THE DISCLOSURE

In order to cable terminal portions in buildings, such as apartment blocks or offices or houses, and in order to serve such buildings with additional cables such as optical fiber cables, telephone cables, electric cables, and TV cables, telecommunications network operators make use, wherever possible, of existing tubular infrastructure, comprising various cable ducts already present in buildings.

Such cable ducts are present in most rooms in buildings and they are used mainly for telephone cabling, electric cabling, or cabling for cable TV. The paths they follow vary considerably as a function of the type of building.

Reusing such cable ducts avoids laying additional cables where they are visible, where such a solution often requires the collective approval of a condominium, which is often difficult to obtain. The use of cable ducts also guarantees that the installation will be long-lasting, since cables are protected against impacts and other alteration work of wall surfaces.

It is therefore advantageous to reuse existing cable ducts as often as possible, even if they are already occupied, with this also being beneficial in terms of how quickly cables can be laid, and thus of cost.

Nevertheless, this is not always possible, either because the existing cable duct does not have enough room, or because the building does not have any such cable ducts (as in old buildings, for example).

While a cable is being laid in a cable duct, cable installation requires traction to be applied to the cable. Traction on the cable may be combined with applying thrust to the cable in order to limit traction forces.

In general, the cables used nowadays for cabling networks in buildings are generally flexible or even very flexible. That constitutes an advantage when a cable is being laid where it is visible, for example, a cable can then be fitted more closely around corners of walls, door frames, baseboards, . . . , but that reduces the effectiveness with which a cable can be passed along a duct.

The optical cables that are presently available on the market have very low force limits. For example, a cable having a diameter of 3 millimeters (mm) can withstand a force of 15 decanewtons (daN) to 20 daN, and a 4 mm cable can withstand about 40 daN.

Those force limits are such that an agent installing the cable and pulling it by hand can rapidly reach and exceed those limits, thereby damaging or even breaking the fiber under certain conditions of cable bending.

Pulling a cable along a duct that is readily occupied by other cables increases those risks.

It is not possible to envisage creating intermediate assistance points along a duct since that would require walls to be pierced, giving rise to delays and extra costs.

The installer must therefore take special precautions when installing such cables. These precautions are not compatible with economic imperatives of passing a cable in a minimum amount of time.

SUMMARY

An exemplary embodiment of the invention provides an installation device for installing a transmission cable in a building, the device being characterized in that it comprises:
- a protective sheath surrounding at least one transmission cable and including at least one longitudinal recess; and
- a rigid element inserted in one of said at least one recess.

The installation device of an embodiment of the invention improves and simplifies cabling the terminal portion by limiting failures and risks of damaging cables while they are being installed.

The device also makes it possible to reduce the time required for installation and consequently to reduce costs.

The rigid element enables the installation device to be subjected to traction and thrust forces that are compatible with those exerted by operators when installing conventional cables. As an example, the acceptable traction force is about 80 daN to 100 daN and acceptable elongation has a value close to 1% when using a rigid element of the type comprising a 1.5 mm diameter resin glass rod.

The rigid element also serves to limit any risk of folding or "kinking" and any risk of applying traction stresses on a small radius of curvature (going round a sharp corner).

The installation device of an embodiment of the invention also makes it possible to install cables in old dwellings that do not have cable ducts, for example, by passing directly along the empty spaces available behind certain wall coverings, sheets, paneling, or even on the floor under a parquet floor or behind a removable baseboard.

Installing a cable in a conduit using the device of an embodiment of the invention is compatible with using a conventional lead or "finger" line device.

Very often, installation can be carried out by a single person.

According to a particular characteristic of the installation device, the rigid element is removable. It may thus be removed or added as a function of the problems encountered on site, thereby making it easier to implement cabling. It may be put into position in the factory, or else during installation.

It may also be removed once the cable has been installed in a conduit. It may be removed in part only, e.g. over a length of cable that is to be installed where it is visible in a dwelling.

The space made available in the protective sheath may then be used for fastening the cable to a supporting wall. Cable laid in this way in an apartment is visible, but remains discreet, and may be installed regardless of the nature of the support.

In a particular embodiment, the rigid element includes a constriction suitable for holding it in the recess of the protective sheath.

This embodiment makes it easier to pass the cable in conduits by keeping the rigid element in place in the sheath.

In another embodiment that may be used on its own or in combination with the above embodiment, the rigid element has a baseplate suitable for fastening the device on a supporting wall. In this embodiment, the rigid element makes it easier to install visible cable in a dwelling.

In an embodiment, the rigid element is a profiled support.

According to a particular characteristic, the protective sheath is cylindrical in shape. This shape is particularly suitable for easy sliding, in particular in a cable duct.

In an embodiment, the protective sheath is constituted of at least first and second cylinders, the first cylinder being suitable for surrounding a transmission cable and the second cylinder being suitable for including the recess.

The flat shape of the protective sheath enhances the possibility of installing the cable in cable ducts that are already occupied by one or more cables. This shape also provides better protection against the risk of impacts or accidental cutting with a knife blade or a blunt tool while undertaking alterations on walls, e.g. when the cable is laid so as to be visible.

In an embodiment, the protective sheath surrounds at least first and second transmission cables, the first cable being of a first type and the second cable being of a second type. The protective sheath may thus serve to pass a plurality of cables simultaneously, which cables may be of the same type or of different types. This makes it possible to reduce the time required for installation and to improve appearance when the cable is laid so as to be visible.

An embodiment of the invention also provides a protective sheath suitable for surrounding at least one transmission cable, the sheath being characterized in that it includes at least one longitudinal recess suitable for receiving a rigid element matching the shape of the recess.

The protective sheath containing a rigid support in its recess enables installation to be performed more quickly and more easily in buildings.

The protective sheath may also receive a rigid support that has already been fastened to the wall in a room of a dwelling, with this being done in simple manner, e.g. by clipping, so as to install the sheath that contains one or more transmission cables, with the sheath being visible in the room.

An embodiment of the invention also provides a profiled support, characterized in that it is suitable for being inserted in a recess of a protective sheath.

BRIEF DESCRIPTION OF THE DRAWINGS

Other features and advantages appear from the following description of embodiments given as non-limiting examples with reference to the accompanying drawings, in which.

DETAILED DESCRIPTION OF ILLUSTRATIVE EMBODIMENTS

Figure 1:
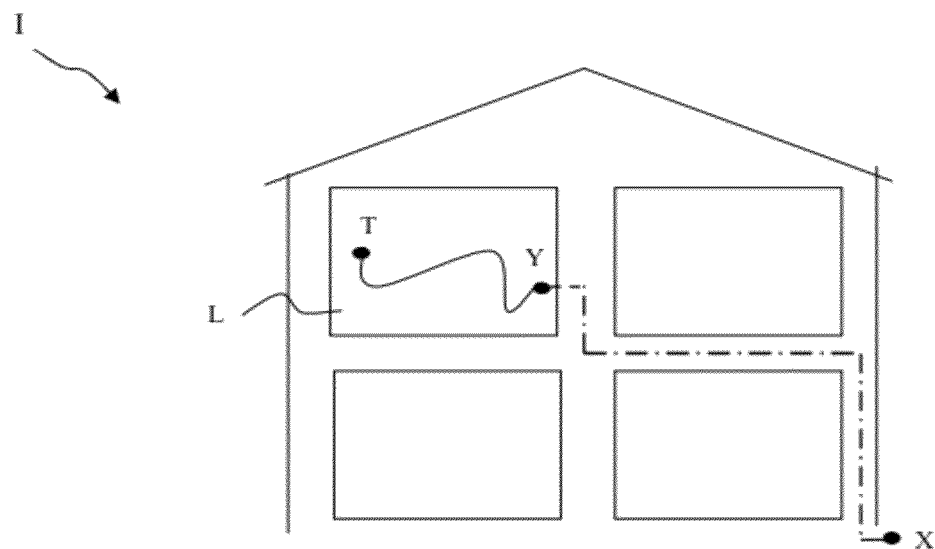
FIG. 1 shows an example of a cable installed inside a building.

FIG. 1 shows an example of a cable installed inside a building. This example relates to putting a cable into place, e.g. an optical cable, in order to enable a resident of an apartment L situated in a building I to be connected to a network.

Implementing the connection requires two stages: a first stage in which the optical cable is taken to a terminal unit situated in the apartment L, and a second stage of fastening in which the cable is fastened in visible mode inside the apartment L.

The first phase consists in taking the cable from an entry point X into the building to a terminal unit T arranged in the apartment L at a point convenient for the resident. This is done by passing the cable through one or more successive conduits between the point X and a point Y, and by passing the cable in visible manner within the apartment between the points Y and T. By way of example, a conduit may be a service shaft or "cable duct" that is reserved for passing cables and that is common to a plurality of apartments, or else a shaft installed within the walls of the apartment. This first stage is performed using an installation device of an embodiment of the invention.

Alternatively, the passage between the points X and Y is implemented in full or in part in spaces that are less "guided", such as a crawl space or double walls, for example.

The second stage consists in positioning and fastening the optical cable to a wall support between the point Y and the unit T.

Figure 2:
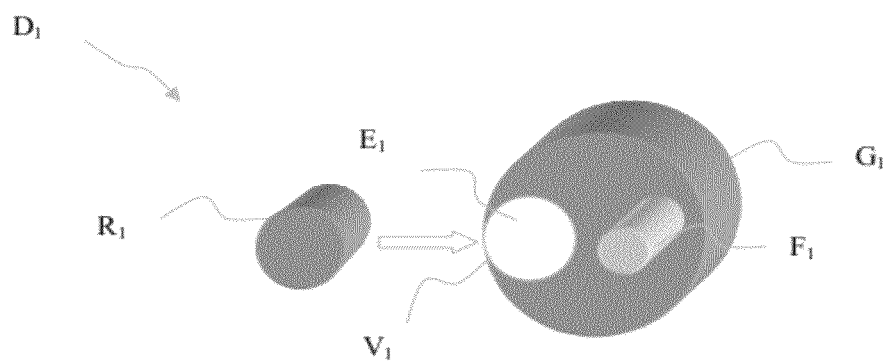
FIG. 2 is a diagram showing an installation device in a first embodiment.

An installation device $D_1$ constituting a first embodiment of the invention is described below with reference to FIG. 2.

The installation device $D_1$ comprises a protective sheath $G_1$ and a rigid element $R_1$.

The protective sheath $G_1$ surrounds an optical cable $F_1$ having one or more optical fibers.

As an alternative, the protective sheath $G_1$ surrounds a plurality of optical cables.

The optical cable $F_1$ may for example be a flexible optical cable with little sensitivity to radius of curvature. The characteristics of such a cable are described for example in ITU Recommendation G657 "Characteristics of a bending loss insensitive single mode optical fiber and cable for the access network". By way of example, its diameter may be 0.25 mm. The optical cable $F_1$ constitutes an example of a transmission cable in the meaning of an embodiment of the invention.

As an alternative, the diameter of the optical cable $F_1$ may be greater than 0.25 mm.

The protective sheath $G_1$ is fabricated around the cable $F_1$ in conventional manner, e.g. by a method of extruding a plastic material. Such a method is known to the person skilled in the art and is not described herein.

In the embodiment described, the optical cable $F_1$ is held tightly within the sheath $G_1$.

As an alternative, the cable $F_1$ may be positioned freely within the protective sheath $G_1$.

The material used for making the protective sheath $G_1$ is a flexible material, e.g. polyvinyl chloride (PVC).

As an alternative, the material used for making the protective sheath $G_1$ may be a polyethylene (PE), a polyamide (PA), or indeed a composite of plastics materials and additives that serve to improve the functional characteristics thereof such as its ability to withstand fire or friction.

The protective sheath $G_1$ is cylindrical in shape. As an alternative, the protective sheath $G_1$ may be of rectangular shape or it may have a right cross-section that is of oval shape.

A recess $E_1$ is formed in the protective sheath $G_1$. The size and the shape of the recess are suitable for enabling the recess to contain the rigid element $R_1$.

By way of example, the recess $E_1$ is made during fabrication of the sheath.

The recess $E_1$ may be of cylindrical shape, for example.

In the embodiment described, the diameter of the rigid element $R_1$ lies in the range 0.5 mm to 1.6 mm.

By way of example, the rigid element $R_1$ is a rod of composite material based on glass fiber and plastics material, e.g. a cylinder of fiber-reinforced plastic (FRP).

As an alternative, the rigid element $R_1$ is a carbon fiber, an aramid fiber, or a rod made of plastics material or of metal.

Also as an alternative, the recess $E_1$ and the rigid element $R_1$ may be of rectangular or oval shape.

By way of example, the rigid example $R_1$ is installed in the protective sheath $G_1$ parallel to the extrusion of the protective sheath by means of an appropriate die, and devices for unwinding, guiding, and adjusting the tension of the element.

As an alternative, the rigid element $R_1$ is installed after the operation of extruding the sheath $G_1$.

The rigid element $R_1$ inserted in the protective sheath $G_1$ serves to impart sufficient rigidity to the assembly to make it easy to pass between the points X and Y.

Advantageously, the protective sheath $G_1$ possesses a longitudinal slot $V_1$. The slot $V_1$ enables the rigid element $R_1$ to be withdrawn from or inserted into the sheath $G_1$.

By way of example, the width of the slot is determined as a function of the material of the protective sheath and of the respective diameters of the protective sheath and of the recess.

As an alternative, the protective sheath $G_1$ does not have a slot.

As an alternative, the slot $V_1$ is presplit and is split open only by an operator seeking to separate the rigid element $R_1$ from the protective sheath $G_1$.

With the installation device $D_1$ being taken to the terminal unit T in the apartment L in the building I, the rigid element $R_1$ may be separated from the protective sheath $G_1$, at least over the portion of the installation device $D_1$ that is visible in the apartment L, i.e. the portion between the points Y and T (FIG. 1).

A profiled support is fastened to the walls of the apartment along the path that is to be followed by the optical cable between the points Y and T. Thereafter, the protective sheath $G_1$ containing the cable $F_1$ is clipped onto the profiled support that has been fastened to the wall.

Figure 3:
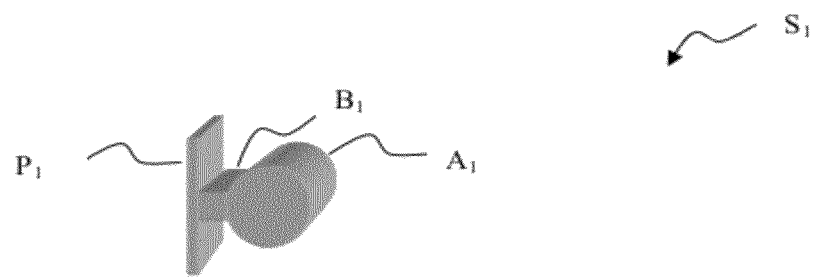
FIG. 3 is a diagram showing a profiled support in a first embodiment.

FIG. 3 shows an example of a profiled support $S_1$ comprising a cylindrical portion $A_1$, a constriction $B_1$, and a baseplate $P_1$.

The cylindrical portion $A_1$ is suitable for being inserted in the recess $E_1$. The constriction $B_1$ enables the protective sheath $G_1$ to be held on the profiled support $S_1$. The baseplate $P_1$ enables the profiled support $S_1$ to be fastened easily to the walls of the apartment.

Advantageously, the constriction $B_1$ of the profiled support $S_1$ and the slot $V_1$ in the protective sheath $G_1$ are of the same size.

The profiled support $S_1$ is made by extruding a section member adapted to the shape of the recess $E_1$ in the protective sheath $G_1$.

As an alternative, the profiled support is made by molding.

The material used for the section member is sufficiently flexible to be compatible with the various configurations of supports on the walls (baseboards or "skirting boards", moldings, trunking, wall corners, windows, ...).

The profiled support $S_1$ is suitable for being laid cleanly and easily.

Placing the protective sheath on a profiled support also makes it possible to separate the protective sheath from the profiled support while work is being done in the apartment, thereby limiting any risk of damage (cutting, impacting, flattening, ...).

The profiled support $S_1$ protects the optical cable $F_1$ from being flattened or from an impact. If the cable is subjected to flattening, the stiffer profiled support $S_1$ provides greater opposition thereto than does the cable.

As an alternative, the flexible protective sheath $G_1$ may be fastened in conventional manner, e.g. by adhesive or by cable clamps along baseboards and windows between the points Y and T.

Also as an alternative, the rigid element $R_1$ need not be separated from the sheath $G_1$ and they may be laid together with adhesive between the points Y and T.

Also as an alternative, it is possible for only portions of the rigid element $R_1$ to be separated from the protective sheath $G_1$. For example, the assembly constituted by the protective sheath and the rigid element may be adhesively bonded to straight baseboards, while the rigid element may be removed to achieve greater flexibility in order to enable the cable to be installed around a window.

Figure 4:
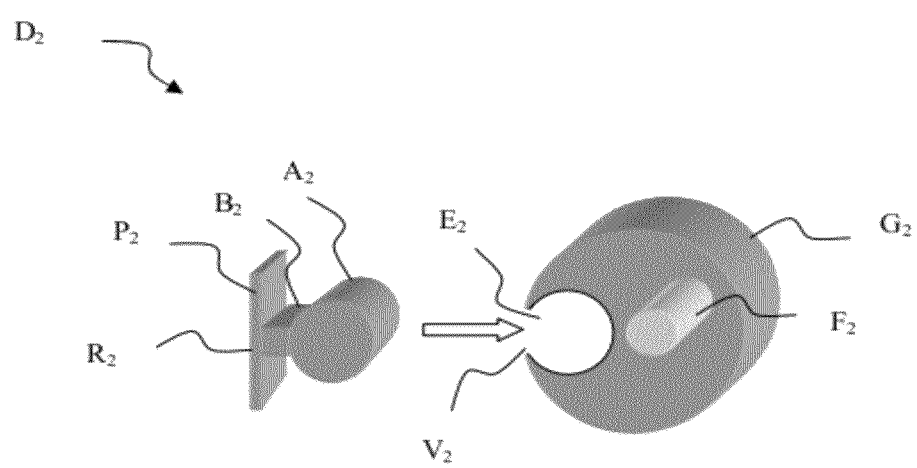
FIG. 4 is a diagram showing an installation device in a second embodiment.

A second embodiment of the installation device is described below with reference to FIG. 4.

The installation device $D_2$ comprises a protective sheath $G_2$ and a rigid element $R_2$.

The protective sheath $G_2$ surrounds an optical cable $F_2$ containing one or more optical fibers.

A recess $E_2$ is made in the protective sheath $G_2$. The protective sheath $G_2$ possesses a longitudinal slot $V_2$ for removing or inserting the rigid element $R_2$ from or into the sheath $G_2$.

The rigid element $R_2$ is a profiled support presenting a cylindrical portion $A_2$, a constriction $B_2$, and a baseplate $P_2$.

The cylindrical portion $A_2$ is suitable for being inserted in the recess $E_2$. The constriction $B_2$ serves to hold the profiled support $R_2$ in the installation device $D_2$ while it is being passed along a conduit. The baseplate $P_2$ enables the profiled support to be fastened easily onto an apartment wall for supporting it.

During the fastening stage, the profiled support $R_2$ is extracted from the protective sheath $G_2$ over the portion of the sheath that is visible in the apartment. Thereafter the profiled support $R_2$ is fastened to the walls along the path that is to be taken by the cable between the points Y and T. The protective sheath $G_2$ is then clipped onto the profiled support $R_2$.

As an alternative, only portions of the rigid element $R_2$ are separated from the protective sheath $G_2$. For example, the assembly constituted by the protective sheath $G_2$ and the rigid element $R_2$ may be adhesively bonded to baseboards and the rigid element $R_2$ may be removed to achieve greater flexibility in order to enable the cable to be fastened around a window.

Figure 5:
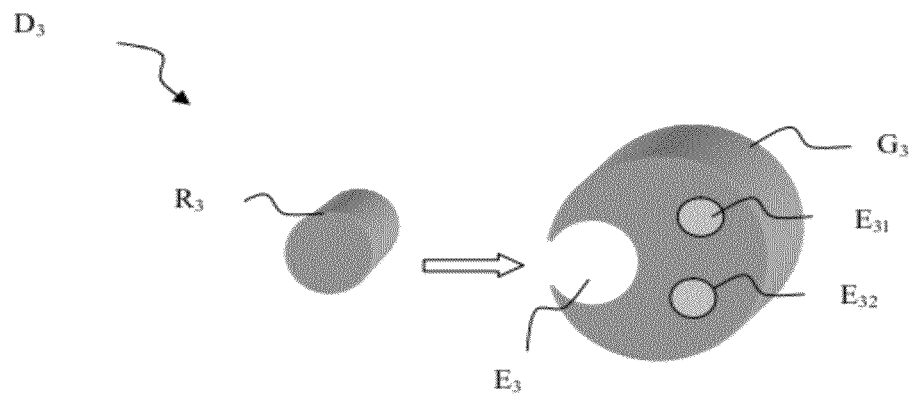
FIG. 5 is a diagram showing an installation device in a third embodiment.

FIG. 5 shows a third embodiment of an installation device $D_3$ comprising a protective sheath $G_3$ and a rigid element $R_3$. The protective sheath $D_3$ has a first recess $E_3$ suitable for receiving the rigid element $R_3$. It also has two other recesses $E_{31}$ and $E_{32}$ suitable respectively for receiving a first transmission cable, e.g. an optical cable, and a second transmission cable, e.g. a pair of copper wires for making a telephone connection of the public switched telephone network (PSTN) type.

Figure 6:
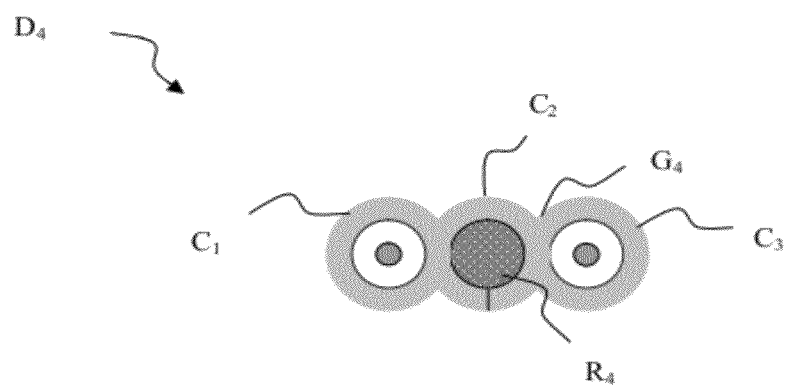
FIG. 6 is a diagram showing an installation device in a fourth embodiment.

FIG. 6 shows a fourth embodiment of an installation device $D_4$ comprising a protective sheath $G_4$ and a rigid element $R_4$. In this embodiment, the protective sheath $G_4$ is made up of three juxtaposed cylinders $C_1$, $C_2$, and $C_3$. The cylinders $C_1$ and $C_3$ are suitable for containing respective transmission cables, e.g. optical fibers. The cylinder $C_2$ contains a longitudinal recess suitable for containing the rigid element $R_4$.

Figure 7:
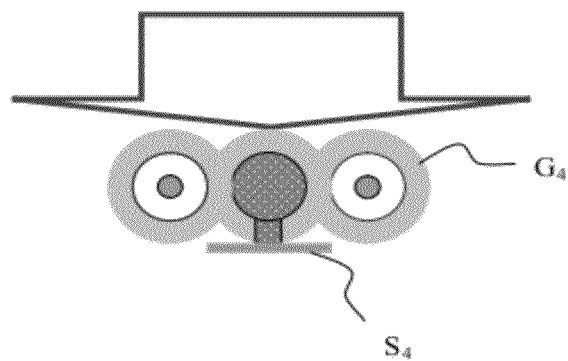
FIG. 7 is a diagram showing the impact of a flattening force on a protective sheath.

FIG. 7 shows the impact of a flattening force applied to the protective sheath $G_4$. After the rigid element $R_4$ has been removed, the protective sheath $G_4$ is clipped onto a profiled support $S_4$. By way of example, the profiled support $S_4$ may be fastened along a baseboard. Under the effect of a flattening force, the rigid profiled support $S_4$ prevents the cables of the protective sheath from being flattened.

Figure 8:
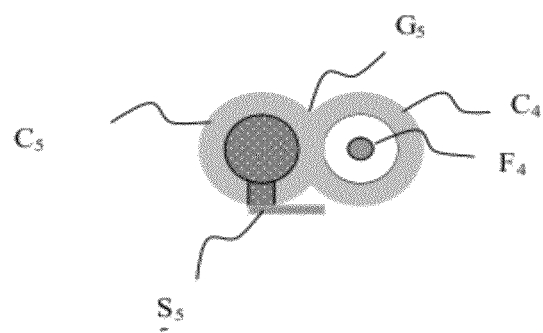
FIG. 8 is a diagram showing an embodiment of a protective sheath.

FIG. 8 shows an embodiment of a protective sheath $G_5$ clipped on a profiled support $S_5$. In this embodiment, the protective sheath $G_5$ is made up of two juxtaposed cylinders $C_4$ and $C_5$. The cylinder $C_4$ is suitable for containing a transmission cable, e.g. an optical fiber $F_4$. The cylinder $C_5$ contains a longitudinal recess suitable for containing a rigid element that matches the shape of the recess.

The longitudinal recess is also suitable for receiving the profiled support $S_5$ having a cylindrical portion, a constriction, and a baseplate. The baseplate of the profiled support $S_5$ may be fastened to a wall for supporting it so as to enable the cable to be fastened in visible mode.

Although the present disclosure has been described with reference to one or more examples, workers skilled in the art will recognize that changes may be made in form and detail without departing from the scope of the disclosure and/or the appended claims.

The invention claimed is:

1. An installation device for installing a transmission cable in a building, the device comprising:
   a protective sheath fabricated around at least one transmission cable, which includes at least one longitudinal recess enabling an elongated rigid rod or fiber to be withdrawn from or inserted into the protective sheath and lacks a slot allowing withdrawal of the transmission cable from the protective sheath such that the protective sheath is inseparable from the transmission cable; and
   the elongated rigid rod or fiber inserted completely in one of said at least one recess, which increases rigidity of the device sufficiently to pass the device in a conduit of the building without increasing a size of the device.

2. The installation device according to claim 1, wherein said at least one transmission cable is off-center with the protective sheath.

3. The installation device according to claim 1, wherein the at least one transmission cable comprises an optical cable.

4. The installation device according to claim 1, wherein the protective sheath is cylindrical in shape.

5. The installation device according to claim 1, wherein the protective sheath comprises at least first and second cylinders, the first cylinder being suitable for surrounding a transmission cable and the second cylinder being suitable for including the recess.

6. The installation device according to claim 1, wherein the protective sheath surrounds at least first and second transmission cables, the first cable being of a first type and the second cable being of a second type.

7. A method comprising:
   providing a transmission cable installation device comprising:
      a protective sheath fabricated around at least one transmission cable, which includes at least one longitudinal recess enabling an elongated rigid rod or fiber to be withdrawn from or inserted into the protective sheath and lacks a slot allowing withdrawal of the transmission cable from the protective sheath such that the protective sheath is inseparable from the transmission cable, wherein an elongated rigid rod or fiber is inserted completely into one of said at least one longitudinal recess so as to increase rigidity of the device sufficiently to pass the device in a conduit of a building without increasing a size of the device; and
   using the transmission cable installation device, with the rigid rod or fiber inserted into the longitudinal recess, for installing the transmission cable in the conduit in the building.

8. The method according to claim 7, wherein said method comprises:
   removing as least a part of the rigid rod or fiber from the longitudinal recess during the installing of the transmission cable in the conduit.

9. The method according to claim 7, wherein the method comprises:
   removing as least a part of the rigid rod or fiber from the longitudinal recess after passage of the transmission cable in the conduit during the step of using.

* * * * *